United States Patent Office.

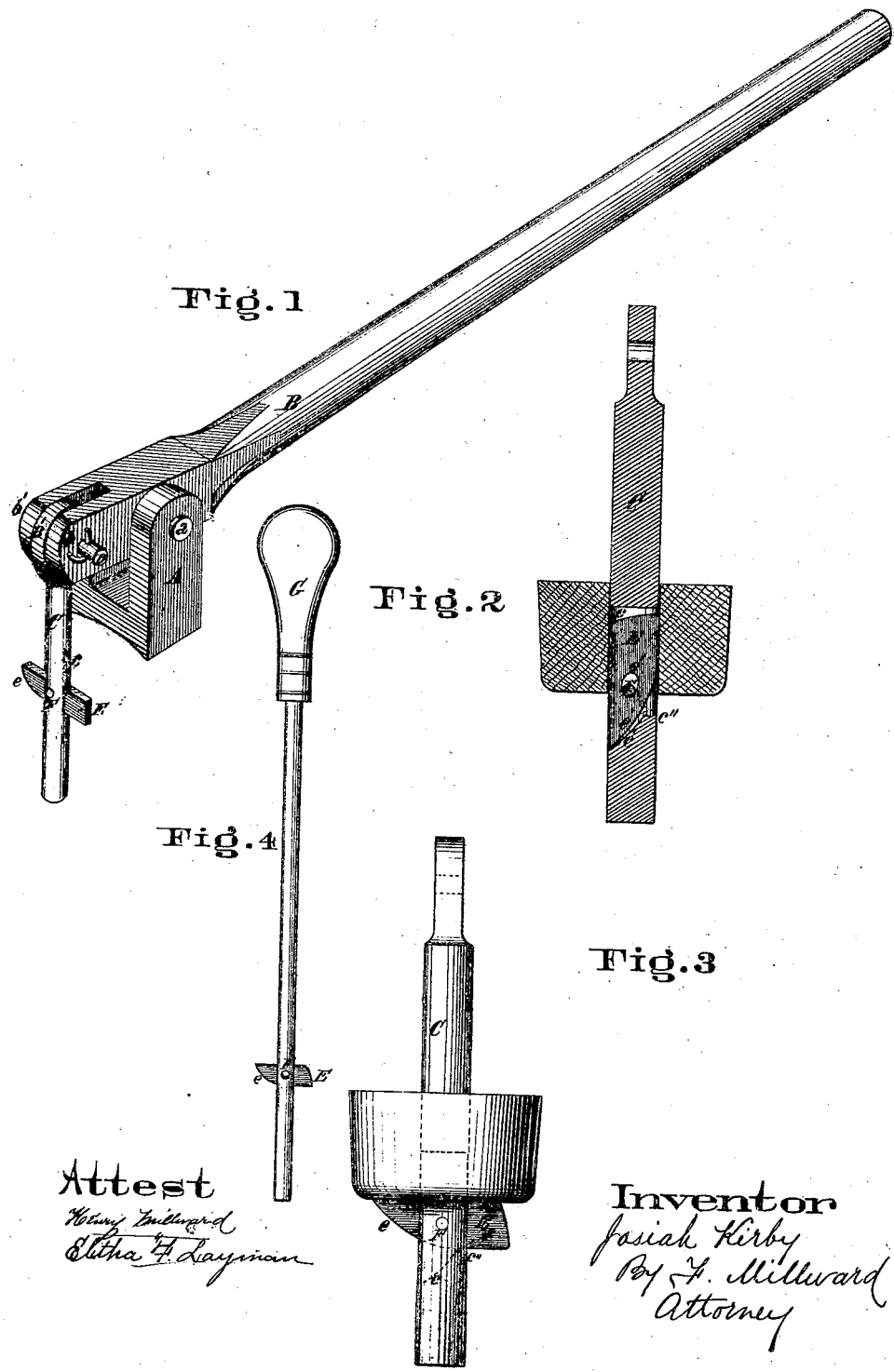

JOSIAH KIRBY, OF CINCINNATI, OHIO.

Letters Patent No. 111,351, dated January 31, 1871.

IMPROVEMENT IN BUNG-EXTRACTORS.

The Schedule referred to in these Letters Patent and making part of the same.

*To all whom it may concern:*

Be it known that I, JOSIAH KIRBY, of Cincinnati, Hamilton county, State of Ohio, have invented a certain new and useful "Improvement in Bung-Drawers;" and I do hereby declare the following to be a sufficiently full, clear, and exact description thereof to enable one skilled in the art to which my invention appertains to make and use it, reference being had to the accompanying drawing making part of this specification.

Nature and Objects of Invention.

My invention consists of an instrument for extracting bungs, which consists of a rod or stem connected to suitable devices for operating it, which rod is fitted with a peculiarly-constructed and operating gravitating-dog or catch adapted to change position and catch under the bung after the stem has been inserted in a small hole purposely prepared in the same.

The object of my invention is the production of a simple and reliable instrument which is adapted to extract any tightly-fitting bung after a small aperture has been bored through the bung for the insertion of the instrument, or that can be used more conveniently to extract the "detachable central plug-bung," for which I have made an application for Letters Patent, the instrument in the latter case being inserted after the forcible driving into the barrel of the cylindrical central plug.

Description of the Accompanying Drawing.

Figure 1 is a perspective view of the instrument with the preferred connecting devices.

Figure 2 is a vertical section of a bung and the stem of the instrument, exhibiting the position of the gravitating-dog or catch on its way through the bung.

Figure 3 is a side elevation of the stem of the instrument and bung, showing the position the dog occupies after passing through the bung.

Figure 4 is a view of a more simple device for operating the puller than that shown in fig. 1.

General Description.

A is the rest or fulcrum to which the lever B is attached, the latter being pivoted or journaled at *a* between the jaws of the rest A.

The lever B is constructed with jaws *b b'*, between which the eye B' of the stem C is journaled on the pin D.

The stem C is slotted at *c* in the manner shown for reception of the gravitating-dog or catch E, which is retained in the slot by the pin F.

The bottom of the slot *c* is inclined or beveled to a considerable extent at *c'*, as shown, and the dog E is beveled on one end, at *e*, to match, for the double purpose of throwing a preponderance of weight upon the opposite end and causing it to so adjust itself, by riding on the inclined slot, that the heavy end of the dog assumes a position from which it can fall into the position shown in fig. 3.

To permit of the automatic adjustment of the dog preparatory to the fall of the same, the hole *e'*, through the dog, is "slotted." When the dog reaches the position shown in fig. 3 it rests upon the square shoulder *c''* of the slot.

Although I prefer the device shown in fig. 1 for operating the puller, other devices may be employed to accomplish the simple object of pulling the stem C, such as a screw, or the device shown in fig. 4, which is simply the provision of the handle G on a longer stem.

Operation.

If the instrument is used to extract the central detachable plug-bung, it will be simply necessary to drive into the barrel the central plug, which is cylindrical, of small diameter, and consequently easily displaced, and then insert the stem C in the manner shown in fig. 2. After the dog E has passed through the bung it assumes, in the manner described, the position shown in fig. 3. If the fulcrum A, which may be concave on the lower face, is then brought to rest upon the barrel, a moderate degree of pressure by hand upon the end of the lever B will be sufficient to extract the bung. If the bung is of the ordinary solid character it will be necessary to bore a hole through it of the size of the stem C, for the introduction of the instrument. The device shown in fig. 4 is operated by inserting the stem a greater distance into the barrel than that necessary for the device shown in fig. 1, and pulling the bung by driving the dog forcibly upward against the bung by means of the handle G.

Claim.

The instrument herein described for extracting bungs, consisting of the stem C F and gravitating-dog E, connected, constructed, and operating substantially in the manner and for the purpose specified.

In testimony of which invention I hereunto set my hand.

JOSIAH KIRBY.

Witnesses:
FRANK MILLWARD,
JOHN A. CONN.